(12) United States Patent
Bae et al.

(10) Patent No.: US 6,532,136 B2
(45) Date of Patent: Mar. 11, 2003

(54) HARD DISK DRIVE APPARATUS

(75) Inventors: Ha-Ki Bae, Kyongsangbuk-do (KR); Jong-Hoon Jeong, Kyongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/397,871

(22) Filed: Sep. 17, 1999

(65) Prior Publication Data

US 2002/0060886 A1 May 23, 2002

(30) Foreign Application Priority Data

Sep. 22, 1998 (KR) ........................................ 1998-39265

(51) Int. Cl.[7] .............................. G11B 21/22; G11B 5/54
(52) U.S. Cl. .................................................. 360/256.2
(58) Field of Search .............................. 360/256, 256.2, 360/264.3, 264.7, 264.8, 264.9, 265

(56) References Cited

U.S. PATENT DOCUMENTS

| | | | |
|---|---|---|---|
| 4,686,595 A | 8/1987 | Bryer | ........................ 360/256 |
| 4,786,995 A | 11/1988 | Stupeck et al. | ............... 360/75 |
| 5,124,867 A * | 6/1992 | Kitahori et al. | ........... 360/256.1 |
| 5,187,627 A | 2/1993 | Hickox et al. | ............ 360/256.2 |
| 5,208,713 A | 5/1993 | Lindsay et al. | ........... 360/256.3 |
| 5,448,435 A * | 9/1995 | Nakazawa et al. | ....... 360/256.3 |
| 5,452,162 A * | 9/1995 | Campbell et al. | ......... 360/265.3 |
| 5,581,424 A * | 12/1996 | Dunfield et al. | ......... 360/256.2 |
| 5,768,057 A | 6/1998 | Fernandes et al. | ....... 360/256.1 |
| 5,801,904 A * | 9/1998 | Kinoshita et al. | ........ 360/256.2 |
| 5,805,384 A | 9/1998 | Bronshvatch et al. | ....... 360/256 |
| 6,108,173 A * | 8/2000 | Iwabuchi | ................. 360/256.2 |

FOREIGN PATENT DOCUMENTS

| | | |
|---|---|---|
| JP | 2-149172 | 12/1990 |
| JP | 4-45353 U * | 4/1992 |
| JP | 4-045353 | 4/1992 |
| JP | 5-174528 | 7/1993 |
| JP | 7-213043 | 8/1995 |
| JP | 7-288965 | 10/1995 |
| JP | 8-249846 | 9/1996 |

OTHER PUBLICATIONS

Notification of Reasons for Rejection mailed Aug. 14, 2001 issued by the Japanese Patent Office and English Translation.

The Board of Patent Appeals and Interferences, *Ex parte Maxine Florey* (Paper No. 26) mailed Sep. 23, 1999.

* cited by examiner

*Primary Examiner*—Brian E. Miller
*Assistant Examiner*—Julie Anne Watko
(74) *Attorney, Agent, or Firm*—Robert E. Bushnell, Esq.

(57) ABSTRACT

A hard disk drive using an improved magnetic latch system. The hard disk drive includes a magnetic material. The magnetic material is fixedly installed at a prescribed position of a bobbin positioned at a rear end of an actuator and also it is situated around the boundary between magnetic poles of a permanent magnet fixed to a yoke when a head is situated at a parking zone.

44 Claims, 4 Drawing Sheets

HARD DISK DRIVE APPARATUS

CLAIM OF PRIORITY

This application makes reference to, incorporates the same herein, and claims all benefits accruing under 35 U.S.C. §119 from an application entitled HARD DISK DRIVE APPARATUS earlier filed in the Korean Industrial Property Office on the $22^{nd}$ day of September 1998, and there duly assigned Serial No. 39265, a copy of which is annexed hereto.

BACKGROUND OF THE INVENTION

1. Technical Field

The present invention relates to a magnetic disk drive, and more particularly, to a latch system for a head of a hard disk drive.

2. Related Art

A hard disk drive (HDD) which is widely used as an auxiliary storage device of a computer has a circuit assembly for mounting major circuit parts on a printed circuit board assembly (PCBA) and a mechanical assembly called a head disk assembly (HDA) for mounting minor circuit parts and major mechanical parts including a head and a hard disk on a printed circuit board (PCB).

If a power supplied to the hard disk drive is turned OFF, a spindle motor stops rotating and a head loses its flying force. Then the head is automatically parked at a parking zone situated at the inner side of a magnetic disk under the control of a system. If vibration or shock is applied from the exterior under the state that the head is parked at the parking zone, the head may invade a data zone of the disk while it is in contact with the disk. Then a hard defect occurs on the disk and data written in the disk may be damaged. To prevent this phenomenon, most hard disk drives use a latch system.

I have found that an effectiveness of latch systems can be improved. Efforts have been made to improve devices and methods concerning latch systems and positioning systems of head units of disk drives.

Exemplars of recent efforts in the art include U.S. Pat. No. 5,187,627 for MAGNETIC LATCH AND CRASH STOP issued to Hickox et al.; U.S. Pat. No. 5,768,057 for AIR VANE LATCH INCORPORATING TOP COVER PROFILING issued to Fernandes et al.; U.S. Pat. No. 4,686,595 for APPARATUS FOR REPOSITIONING A TRANSDUCER IN THE ABSENCE OF ELECTRICAL CURRENT TO A DRIVE SYSTEM issued to Bryer; U.S. Pat. No. 5,805,384 for ACTUATOR LATCH ACTIVATED BY HEAD BRAM LOAD FOR HARD DISCDRIVES issued to Bronshvatch et al.; U.S. Pat. No. 4,786,995 for AUTOMATIC HEAD RETRACT SYSTEM issued to Stupeck et al.; and U.S. Pat. No. 5,208,713 for BISTABLE MAGNETIC/ELECTROMAGNETIC LATCH FOR DISK FILE ACTUATOR issued to Lindsay et al.

While these recent efforts provide advantages, I note that they fail to adequately provide an improved latch system of a hard disk drive apparatus.

SUMMARY OF THE INVENTION

It is therefore an object of the present invention to provide a hard disk drive using an improved magnetic latch system.

It is another object of the present invention to provide a hard disk drive using a magnet latch system without an additional magnet (inner crash stopper).

In accordance with one aspect of the present invention, a hard disk drive including a base, a hard disk which is rotatably installed in the base and has a parking zone and a data zone, an actuator which has a head situated at its leading end and a voice coil wound on a bobbin situated at its rear end and is installed in the base to shift the head onto the hard disk, and a yoke which is fixed to the base and has at least a permanent magnet, wherein the voice coil is situated between upper and lower sides of the yoke, includes a magnetic substance installed fixedly at a prescribed position of the bobbin, and situated around the boundary between magnetic poles of the permanent magnet when the head is situated at the parking zone.

To achieve these and other objects in accordance with the principles of the present invention, as embodied and broadly described, the present invention provides a disk drive apparatus having a base, comprising: a rigid platter being rotatably installed in said base and including a data zone storing data and a parking zone; an actuator having a head reading data from or writing data to said data zone when power is supplied to said apparatus, said actuator being movably mounted to said base and transporting said head across said data zone of said rigid platter; a frame being secured to said base, said frame having an upper side and a lower side, and said frame having at least one permanent magnet forming a boundary zone between magnetic poles; a bobbin unit being installed on said actuator and having a coil wound on said bobbin unit, said coil on said bobbin unit being disposed between said upper and lower sides of said frame; and a magnetic substance being installed fixedly at a predetermined position on said bobbin unit and responding to a magnetic force of said at least one permanent magnet, said magnetic force forcing said magnetic substance toward said boundary zone between said magnetic poles when power is not supplied to said apparatus, said head being parked at said parking zone when said magnetic substance is forced toward said boundary zone, said head being moved to said parking zone in response to said magnetic force being applied from said at least one permanent magnet to said magnetic substance.

To achieve these and other objects in accordance with the principles of the present invention, as embodied and broadly described, the present invention provides an apparatus, comprising: a disk drive including a base; a rigid platter being rotatably installed in said base, said rigid platter including a data zone storing data and a parking zone; an actuator having a first end and a second end, said first end including a head reading data from or writing data to said data zone when power is supplied to said disk drive, said actuator being movably mounted to said base, said actuator transporting said head across said data zone of said rigid platter; a yoke having an upper side and a lower side, said yoke being secured to said base, and said yoke having at least one permanent magnet forming a boundary zone between magnetic poles; a bobbin unit having a coil wound on said bobbin unit, said bobbin unit being located at said second end of said actuator, said coil on said bobbin unit being disposed between said upper and lower sides of said yoke, said coil generating an electromotive force using a current induced by a magnetic field generated by said at least one permanent magnet; and a magnetic substance being installed fixedly at a predetermined position on said bobbin unit and responding to a magnetic force of said at least one permanent magnet, said magnetic force forcing said magnetic substance toward said boundary zone between said magnetic poles when power is not supplied to said disk drive, said head being parked at said parking zone when said magnetic substance is forced toward said boundary zone.

To achieve these and other objects in accordance with the principles of the present invention, as embodied and broadly described, the present invention provides a disk drive apparatus having a base, comprising: a rigid platter being rotatably installed in said base and including a data zone storing data and a parking zone, said rigid platter rotating around a center axis and having an outer edge, said parking zone being disposed between the center axis and said data zone, said data zone being disposed between said parking zone and the outer edge; an actuator having a head reading data from or writing data to said data zone when power is supplied to said apparatus, said actuator being movably mounted to said base and transporting said head across said data zone of said rigid platter; a frame being secured to said base, said frame having an upper side and a lower side, and said frame having at least one permanent magnet forming a boundary zone between magnetic poles; a bobbin unit being installed on said actuator and having a coil wound on said bobbin unit, said coil on said bobbin unit being disposed between said upper and lower sides of said frame; a magnetic substance being installed fixedly at a predetermined position on said bobbin unit and responding to a magnetic force of said at least one permanent magnet, said magnetic force forcing said magnetic substance toward said boundary zone between said magnetic poles when power is not supplied to said apparatus, said head being parked at said parking zone when said magnetic substance is forced toward said boundary zone, said head being moved to said parking zone in response to said magnetic force being applied from said at least one permanent magnet to said magnetic substance; and a stopping unit being mounted to said base at a predetermined location, blocking said actuator from moving said head toward the center axis beyond said parking zone, said stopping unit not holding said actuator with a magnetic force.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The types of the latch system used in a hard disk drive include magnetic latch, solenoid latch, and air-flow latch. The magnetic latch type uses magnetic force generated from a magnet, and the solenoid and air-flow latch types use spring force acting on a locking device.

Figure 1:
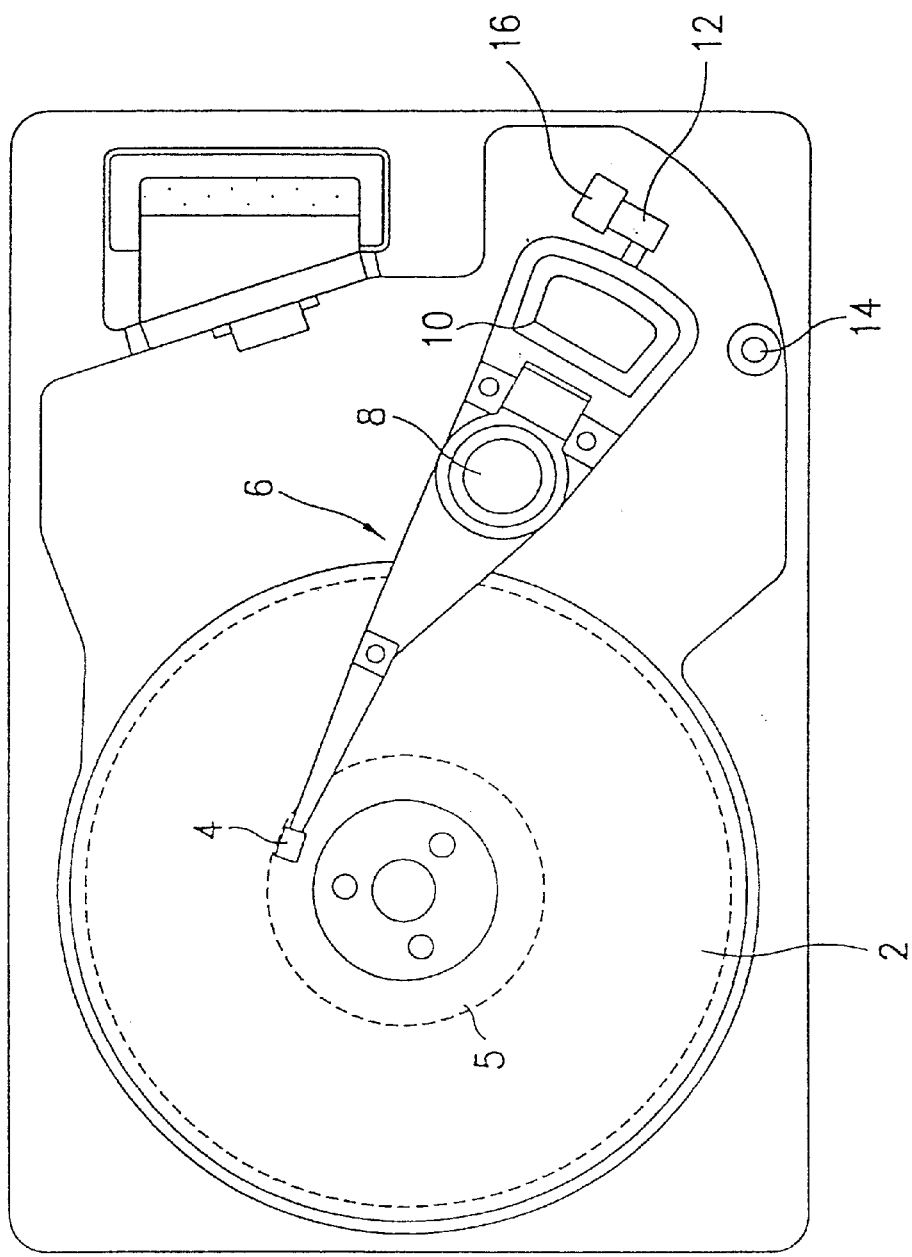
FIG. 1 illustrates a schematic structure of a head disk assembly of a magnetic latch type.

Turn now to FIG. 1, which shows a schematic structure of a head disk assembly of a magnetic latch type. FIG. 1 illustrates the schematic structure of a head disk assembly using the magnetic latch type. A hard disk 2 divided into a parking zone 5 and a data zone is rotatably installed in the base of the head disk assembly. Data transmitted from a host computer is magnetically written in the hard disk 2 which rotates at constant linear velocity by a spindle motor installed in the base. A head 4 installed at one end of an actuator 6 writes data transmitted from the host computer in the disk 2 or reads data written in the disk 2 while maintaining a prescribed flying height from the surface of the disk 2 during the rotation of the disk 2. An iron plate 12 which is easily attachable to a magnet is installed at the other end of the actuator 6. The actuator 6 is supported by a pivot bearing 8. The actuator 6 has a voice coil 10 so that it can be fixed to a bobbin between the pivot bearing 8 and the iron plate 12. The actuator 6 turns on the pivot bearing 8 by a driving force of a voice coil motor (VCM) to move in the radial direction of the disk 2. An outer crash stopper 14 is for preventing deviation of the head 4 from the disk 2. A magnet (or inner crash stopper) 16 is adhered to the iron plate 12 by a magnetic force when a hard disk drive is not in operation, thereby fixing the actuator 6. In FIG. 1, there is shown the actuator 6 latched by the magnet 16. In this case, the head 4 is parked at the parking zone 5.

As shown in FIG. 1, a latch system of the magnetic type uses an additional magnet (inner crash stopper) 16. If the latch system can be constructed without using the additional magnet 16, a number of parts can potentially be reduced.

Figure 2:
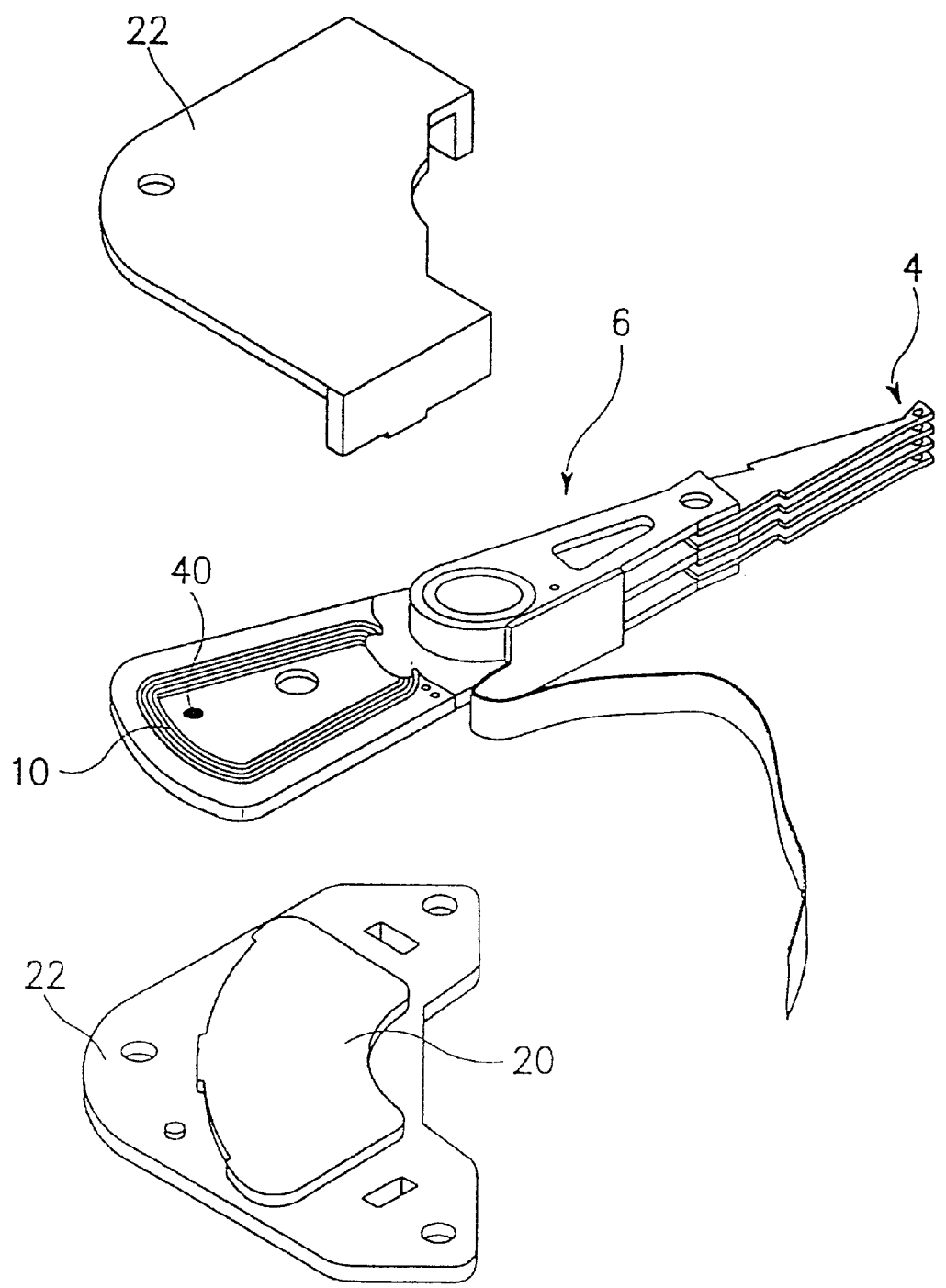
FIG. 2 illustrates constituents of a voice coil motor and the schematic structure of a latch system, in accordance with the principles of the present invention.

Turn now to FIG. 2, which shows constituents of a voice coil motor and the schematic structure of a latch system, in accordance with the principles of the present invention. Referring to FIG. 2, a voice coil motor (VCM) for shifting the head 4 to a desired position on the disk 2 has the voice coil 10, and a magnetic circuit consisting of a VCM magnet 20 and a yoke 22. The VCM magnet 20 is a permanent magnet and generates a magnetic field. The yoke 22 concentrates flux in a prescribed direction. The voice coil 10 generates an electromotive force using a current induced by the magnetic field.

Power to drive the actuator 6 in its rotation about the pivot bearing 8 is provided by a voice coil motor (VCM). The voice coil motor consists of a coil 10 which is supported by the actuator 6 within the magnetic field of at least one permanent magnet 20 which is fixedly mounted to a base of a hard disk drive, all in a manner well known in the industry.

More specifically, the yoke 22 consists of an upper yoke and a lower yoke. The VCM magnet 20 is fixed to the respective inner surfaces of the upper and lower yokes. The rear side of the actuator 6 is positioned within the yoke 22. The bobbin positioned at the rear side of the actuator 6 is fixedly wound with the voice coil 10.

As illustrated in FIG. 2, the novel voice coil motor (VCM) does not include the iron plate 12 installed at the end of the actuator 6 and the inner crash stop 16, which are shown in FIG. 1. Instead, a core 40 is fixedly installed at a prescribed location of the bobbin positioned at the rear side of the actuator 6. The core 40 is made of a magnetic substance. A latch system according to the present invention is constructed using the voice coil motor magnets 20 fixed to the upper and lower sides of the yoke 22 and the core 40 fixedly installed at the prescribed position of the bobbin positioned at the rear side of the actuator 6. The core 40 can correspond to a magnetic mass which can be pushed or pulled by magnetic force.

Figure 3:
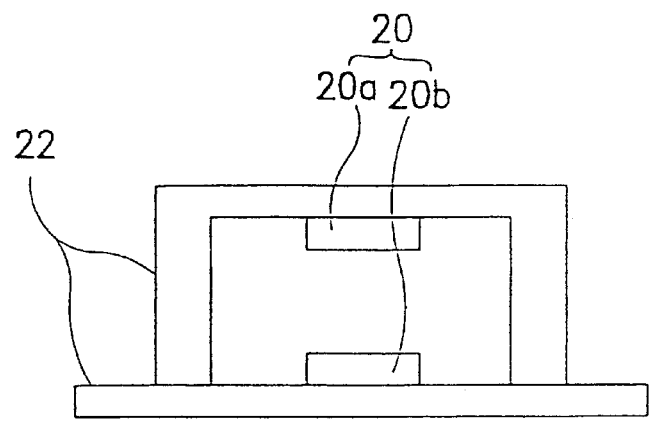
FIG. 3 illustrates the arrangement of a yoke and a magnet of a voice coil motor, in accordance with the principles of the present invention.
Figure 4:
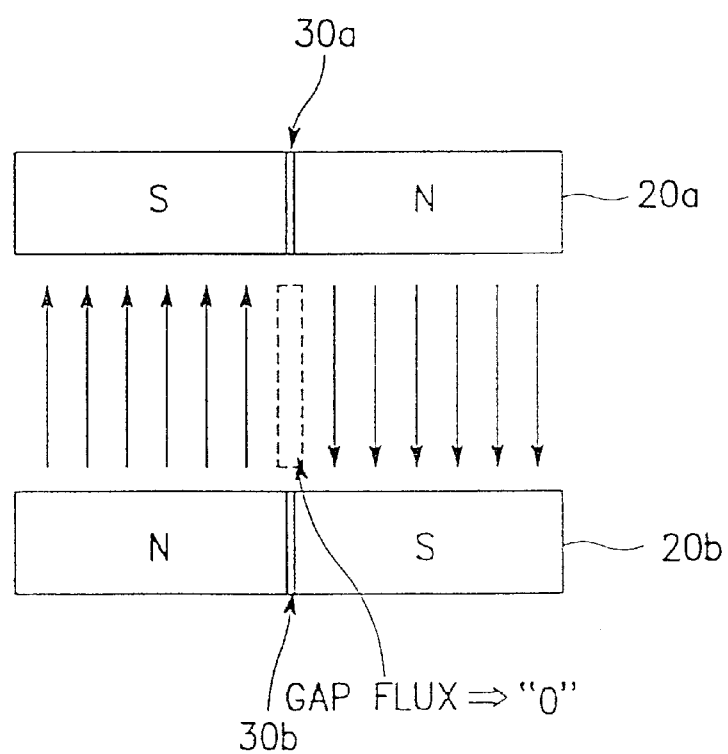
FIG. 4 illustrates flux paths in voice coil motor magnets.

Turn now to FIG. 3, which shows the arrangement of a yoke and a magnet of a voice coil motor, in accordance with the principles of the present invention. FIG. 3 illustrates an arrangement of the yoke 22 and the voice coil motor magnet 20 of the voice coil motor. FIG. 4 illustrates flux paths of the voice coil motor magnet 20. Referring to FIG. 3, an upper magnet 20a and a lower magnet 20b are fixedly mounted on the upper and lower sides of the yoke 22. The upper and lower magnets 20a and 20b each have the N pole and S pole as illustrated in FIG. 4. There is a neutral zone between the N and S poles. A neutral zone 30a is a boundary between the N and S poles of the upper magnet 20a of the VCM, and a neutral zone 30b is a boundary between the N and S poles of the lower magnet 20b of the VCM. Flux is generated from the N pole of the lower magnet 20b to the S pole of the upper magnet 20a and from the N pole of the upper magnet 20a to the S pole of the lower magnet 20b. A gap flux is zero at a gap between the neutral zones 30a and 30b. Therefore, if a magnetic substance (i.e., core) is positioned around the gap area, a flux force will be applied to the magnetic substance in the left or right direction, on the basis of the neutral zones 30a and 30b.

If the magnetic substance is situated at the left of the gap space on the basis of the neutral zones 30a and 30b, it will be moved to the left from the neutral zones 30a and 30b under the influence of the left flux. If the magnetic substance is situated at the right side of the gap area, it will be moved to the right side from the neutral zones 30a and 30b under the influence of the right flux.

Although there has been described the magnetic substance moved in such a structure that the upper and lower magnets 20a and 20b are fixed to the upper and lower sides of the yoke 22 as shown in FIG. 3, the principles of the present invention can be applied even to the case where the magnet is fixed to only one of them.

Figure 5:
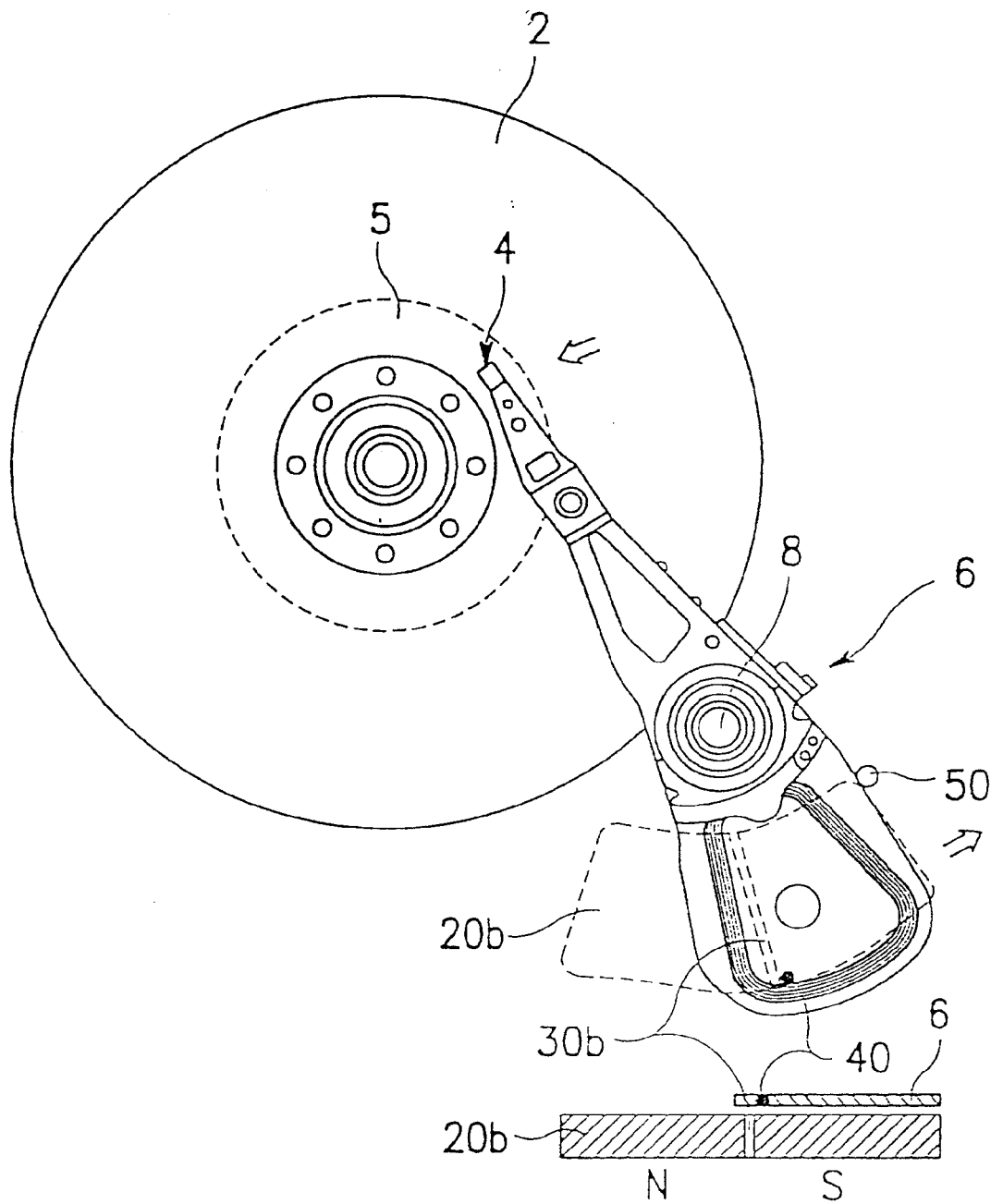
FIG. 5 illustrates the schematic structure of a head disk assembly using a latch system, in accordance with the principles of the present invention.

Turn now to FIG. 5, which shows the schematic structure of a head disk assembly using a latch system, in accordance with the principles of the present invention. The latch system shown in FIG. 5 employs the above-described principles. Referring to FIG. 5, the core 40 is fixedly installed at a prescribed position of the bobbin situated at the rear end of the actuator 6. In the case where the actuator 6 is positioned at the parking zone 5, if the core 40 is slightly inclined toward the right side from the neutral zones 30a and 30b of the VCM magnet 20, the magnetic force is applied to the core 40 in the right direction of the neutral zones 30a and 30b under the influence of the right flux of the voice coil motor magnet 20. Then the leading end of the actuator 6 at which the head 4 is situated is pushed to the left and thus the actuator 6 continues to stay at the parking zone 5. Therefore, it is preferable that the core 40 is slightly inclined toward the right side from the neutral zones 30a and 30b of the voice coil motor magnet 20. In a preferred embodiment of the present invention, the core 40 is fixedly installed at the inner side of the bobbin wound with the voice coil 10 out of the rear end of the actuator 6, as shown in FIGS. 5 and 2. More specifically, the core 40 is situated at the just right side of the neutral zones 30a and 30b of the voice coil motor magnet 20. When the core 40 is shifted to the right from the neutral zones 30a and 30b of the voice coil motor magnet 20, an external shock may cause the head 4 to easily move by the distance shifted to the right. Then the head 4 may deviate from the parking zone 5 of the disk 2 and invade the data zone. Therefore, the core 40 should be located at the rear end of the actuator 6, slightly leaning toward the right side of the neutral zones 30a and 30b of the voice coil motor magnet 20.

It is preferable that the position of the core 40 is aligned with the end of the voice coil motor magnet 20 which has the strongest magnet force out of the rear end of the actuator 6. The core 40 being a magnetic substance may be inserted into that position when an arm of the actuator 6 is manufactured.

To prevent the head 4 from colliding with the spindle motor during its parking at the parking zone 5, an inner crash stopper 50 may be additionally provided. This inner crash stopper 50 does not have a magnet and it is used only for preventing the head 4 from colliding with the spindle motor.

An operation for unlatching the head 4 latched at the parking zone 5 by the latch system is as follows. The head 4 situated at the parking zone 5 during power OFF is shifted to the data zone of the disk, as the actuator 6 revolves by the voice coil motor upon power-up.

As described above, the latch system is constructed using the core situated at the rear end of the actuator corresponding to a position shifted slightly to the right side from the neutral zones of the voice coil motor magnet.

The present invention should not be limited to the specific embodiment illustrated above. For example, the parking zone may be situated at the outer side of the disk instead of the inner side of the disk.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a platter being rotatably installed on a base, said platter having a center axis of rotation, an outer edge, a data zone storing data, and a parking zone, said parking zone being disposed between said center axis and said data zone, said data zone being disposed between said parking zone and said outer edge;
   an actuator being movably mounted to said base at a pivot, said actuator having a first end and a second end, said first end including at least one head reading data from said data zone when a normal operating power is supplied to said apparatus, said second end including a bobbin and a coil wound on said bobbin;
   at least one magnet being connected to said base adjacent to said bobbin, providing a magnetic force;
   a magnetic material being fixedly installed at a predetermined position of said actuator inside said coil; and a crash stopper being mounted at a predetermined location on said base and blocking said actuator, said actuator contacting said crash stopper when said normal operating power is not supplied to said apparatus;

when said normal operating power is not supplied to said apparatus, said magnetic material moving in response to said magnetic force to park said at least one head in said parking zone, said magnetic force acting upon said magnetic material to hold said at least one head in said parking zone.

2. The apparatus of claim 1, said magnetic force acting upon said magnetic material being the strongest force holding said at least one head in said parking zone.

3. The apparatus of claim 1, said crash stopper blocking said actuator from moving said at least one head toward said center axis beyond said parking zone.

4. The apparatus of claim 1, said crash stopper providing a blocking force to block said actuator, said crash stopper not providing a holding force to hold said actuator.

5. The apparatus of claim 1, said at least one magnet forming a boundary zone between magnetic poles, said magnetic material being located near said boundary zone and on a first side of said boundary zone when said at least one head is parked in said parking zone.

6. The apparatus of claim 5, said magnetic material being moved from said first side of said boundary zone into said boundary zone and then to a second side of said boundary zone when said actuator moves said at least one head in a clockwise direction out of said parking zone and into said data zone.

7. The apparatus of claim 5, when said normal operating power is not supplied to said apparatus and said apparatus receives an external shock, said magnetic material being movable only between a first position near said boundary zone on said first side of said boundary zone and a second position in said boundary zone.

8. The apparatus of claim 5, when said normal operating power is not supplied to said apparatus and said apparatus receives an external shock, said at least one head not leaving said parking zone.

9. The apparatus of claim 5, said magnetic material being moved from said first side of said boundary zone into said boundary zone and then to a second side of said boundary zone when said actuator moves said at least one head in a clockwise direction out of said parking zone and into said data zone.

10. The apparatus of claim 1, said crash stopper being not magnetic.

11. An apparatus, comprising:
a platter being rotatably installed on a base, said platter having a center axis of rotation, an outer edge, a data zone storing data, and a parking zone, said parking zone being disposed between said center axis and said data zone, said data zone being disposed between said parking zone and said outer edge;
an actuator being movably mounted to said base at a pivot, said actuator having a first end and a second end, said first end including at least one head reading data from said data zone when a normal operating power is supplied to said apparatus, said second end including a bobbin and a coil wound on said bobbin;
at least one magnet being connected to said base adjacent to said bobbin, providing a magnetic force;
a magnetic material being fixedly installed at a predetermined position of said actuator inside said coil; and
a crash stopper being mounted at a predetermined location on said base and blocking said actuator;
when said normal operating power is not supplied to said apparatus, said magnetic material moving in response to said magnetic force to park said at least one head in said parking zone, said magnetic force acting upon said magnetic material to hold said at least one head in said parking zone;
said actuator contacting said crash stopper when said at least one head is being held in said parking zone.

12. The apparatus of claim 11, said magnetic force acting upon said magnetic material being the strongest force holding said at least one head in said parking zone.

13. The apparatus of claim 11, said crash stopper providing a blocking force to block said actuator, said crash stopper not providing a holding force to hold said actuator.

14. The apparatus of claim 11, said at least one magnet forming a boundary zone between magnetic poles, said magnetic material being located near said boundary zone and on a first side of said boundary zone when said at least one head is parked in said parking zone.

15. The apparatus of claim 14, when said normal operating power is not supplied to said apparatus and said apparatus receives an external shock, said magnetic material being movable only between a first position near said boundary zone on said first side of said boundary zone and a second position in said boundary zone.

16. The apparatus of claim 14, when said normal operating power is not supplied to said apparatus and said apparatus receives an external shock, said at least one head not leaving said parking zone.

17. The apparatus of claim 11, said crash stopper being not magnetic.

18. An apparatus, comprising:
a platter being rotatably installed on a base, said platter having a center axis of rotation, an outer edge, a data zone storing data, and a parking zone, said parking zone being disposed between said center axis and said data zone, said data zone being disposed between said parking zone and said outer edge;
an actuator being movably mounted to said base at a pivot, said actuator having a first end and a second end, said first end including at least one head reading data from said data zone when a normal operating power is supplied to said apparatus, said second end including a bobbin and a coil wound on said bobbin;
at least one magnet being connected to said base adjacent to said bobbin, providing a magnetic force; and
a magnetic material being fixedly installed at a predetermined position of said actuator inside said coil;
a crash stopper being mounted at a predetermined location on said base and blocking said actuator;
when said normal operating power is not supplied to said apparatus, said magnetic material moving in response to said magnetic force to park said at least one head in said parking zone, said magnetic force acting upon said magnetic material to hold said at least one head in said parking zone;
said at least one head being held in said parking zone principally by said magnetic force acting upon said magnetic material;
said actuator contacting said crash stopper when said normal operating power is not supplied to said apparatus.

19. The apparatus of claim 18, said crash stopper blocking said actuator from moving said at least one head toward said center axis beyond said parking zone.

20. The apparatus of claim 18, said crash stopper being not magnetic.

21. The apparatus of claim 18, said crash stopper providing a blocking force to block said actuator, said crash stopper not providing a holding force to hold said actuator.

22. The apparatus of claim 18, said at least one magnet forming a boundary zone between magnetic poles, said magnetic material being located near said boundary zone and on a first side of said boundary zone when said at least one head is parked in said parking zone.

23. The apparatus of claim 22, said magnetic material being moved from said first side of said boundary zone into said boundary zone and then to a second side of said boundary zone when said actuator moves said at least one head in a clockwise direction out of said parking zone and into said data zone.

24. The apparatus of claim 22, when said normal operating power is not supplied to said apparatus and said apparatus receives an external shock, said magnetic material being movable only between a first position near said boundary zone on said first side of said boundary zone and a second position in said boundary zone.

25. The apparatus of claim 22, when said normal operating power is not supplied to said apparatus and said apparatus receives an external shock, said at least one head not leaving said parking zone.

26. An apparatus, comprising:

a platter being rotatably installed on a base, said platter having a center axis of rotation, an outer edge, a data zone storing data, and a parking zone, said parking zone being disposed between said center axis and said data zone, said data zone being disposed between said parking zone and said outer edge;

an actuator being movably mounted to said base at a pivot, said actuator having a first end and a second end, said first end including at least one head reading data from said data zone when a normal operating power is supplied to said apparatus, said second end including a bobbin and a coil wound on said bobbin;

at least one magnet being connected to said base adjacent to said bobbin, providing a magnetic force;

a magnetic material being fixedly installed at a predetermined position of said actuator inside said coil; and a crash stopper being mounted at a predetermined location on said base and blocking said actuator;

when said normal operating power is not supplied to said apparatus, said magnetic material moving in response to said magnetic force to park said at least one head in said parking zone, said magnetic force acting upon said magnetic material to hold said at least one head in said parking zone;

said at least one head being held in said parking zone principally by said magnetic force acting upon said magnetic material;

said actuator contacting said crash stopper when said at least one head is being held in said parking zone.

27. The apparatus of claim 26, said crash stopper blocking said actuator from moving said at least one head toward said center axis beyond said parking zone.

28. The apparatus of claim 26, said crash stopper being not magnetic.

29. The apparatus of claim 26, said crash stopper providing a blocking force to block said actuator, said crash stopper not providing a holding force to hold said actuator.

30. The apparatus of claim 26, said at least one magnet forming a boundary zone between magnetic poles, said magnetic material being located near said boundary zone and on a first side of said boundary zone when said at least one head is parked in said parking zone.

31. The apparatus of claim 30, said magnetic material being moved from said first side of said boundary zone into said boundary zone and then to a second side of said boundary zone when said actuator moves said at least one head in a clockwise direction out of said parking zone and into said data zone.

32. The apparatus of claim 30, when said normal operating power is not supplied to said apparatus and said apparatus receives an external shock, said magnetic material being movable only between a first position near said boundary zone on said first side of said boundary zone and a second position in said boundary zone.

33. The apparatus of claim 30, when said normal operating power is not supplied to said apparatus and said apparatus receives an external shock, said at least one head not leaving said parking zone.

34. A method of controlling an actuator apparatus, comprising:

rotating a platter on a base, said platter having a center axis of rotation, an outer edge, a data zone storing data, and a parking zone, said parking zone being disposed between said center axis and said data zone, said data zone being disposed between said parking zone and said outer edge;

reading data from said data zone when a normal operating power is supplied to said apparatus, said reading being performed by an actuator having a first end and a second end, said first end including at least one head, said second end including a bobbin and a coil wound on said bobbin, said base including at least one magnet mounted adjacent to said bobbin, said actuator having a magnetic material mounted inside said coil;

blocking said actuator with a crash stopper, said crash stopper being mounted at a predetermined location on said base;

when said normal operating power is not supplied to said apparatus, moving said magnetic material in response to a magnetic force of said at least one magnet to park said at least one head in said parking zone and holding said at least one head in said parking zone by said magnetic force acting upon said magnetic material; and when said normal operating power is not supplied to said apparatus, said actuator contacting said crash stopper.

35. The method of claim 34, further comprising:

when said at least one head is being parked in said parking zone, moving said magnetic material to a position near a boundary zone and on a first side of said boundary zone, said at least one magnet forming said boundary zone between magnetic poles.

36. The method of claim 35, further comprising:

when said actuator moves said at least one head in a clockwise direction out of said parking zone and to said data zone, moving said magnetic material from said first side of said boundary zone to said boundary zone and then to a second side of said boundary zone.

37. The method of claim 36, further comprising:

when said normal operating power is not supplied to said apparatus and said apparatus receives an external shock, moving said magnetic material only between a first position near said boundary zone on said first of said boundary zone and a second position in said boundary zone.

38. The method of claim 37, further comprising:

when said magnetic material only moves between said first position and said second position, not moving said at least one head out of said parking zone.

39. The method of claim 34, said holding of said at least one head in said parking zone being performed principally by said magnetic force acting upon said magnetic material.

40. The method of claim 34, said blocking of said actuator preventing said at least one head from moving toward said center axis beyond said parking zone.

41. The method of claim 34, said crash stopper corresponding to a nonmagnetic crash stopper.

42. The method of claim 34, said blocking of said actuator performed by said crash stopper corresponding to stopping a counter-clockwise movement of said at least one head, said crash stopper not providing a holding force, said crash stopper not holding said actuator, said crash stopper not holding said at least one head.

43. The method of claim 34, when said at least one head is being held in said parking zone, said actuator contacting said crash stopper.

44. The method of claim 34, said at least one magnet corresponding to at least one permanent magnet.

* * * * *